United States Patent
Scharmüller et al.

(10) Patent No.: US 8,596,665 B2
(45) Date of Patent: Dec. 3, 2013

(54) TRAILER COUPLING

(76) Inventors: Josef Scharmüller, Fornach (AT); Josef Scharmüller, Jr., Fornach (AT)

(*) Notice: Subject to any disclaimer, the term of this patent is extended or adjusted under 35 U.S.C. 154(b) by 0 days.

(21) Appl. No.: 13/378,796

(22) PCT Filed: May 21, 2010

(86) PCT No.: PCT/AT2010/000180
§ 371 (c)(1),
(2), (4) Date: Mar. 16, 2012

(87) PCT Pub. No.: WO2010/144927
PCT Pub. Date: Dec. 23, 2010

(65) Prior Publication Data
US 2012/0274049 A1     Nov. 1, 2012

(30) Foreign Application Priority Data

Jun. 16, 2009  (AT) .................................. A 924/2009

(51) Int. Cl.
*B60D 1/06*     (2006.01)
*B60D 1/28*     (2006.01)

(52) U.S. Cl.
USPC ............................ 280/507; 280/511; 403/124

(58) Field of Classification Search
USPC ........... 280/511, 506, 507; 285/271; 403/131, 403/124, 125, 126
See application file for complete search history.

(56) References Cited

U.S. PATENT DOCUMENTS

| | | | | |
|---|---|---|---|---|
| 4,032,171 A * | 6/1977 | Allen et al. | ................... | 280/507 |
| 4,208,065 A * | 6/1980 | Hansen | ...................... | 280/507 |
| 4,433,854 A * | 2/1984 | Smith | ......................... | 280/511 |
| 5,290,057 A | 3/1994 | Pellerito | | |
| 5,655,848 A * | 8/1997 | Catron | ......................... | 403/137 |
| 6,203,050 B1 | 3/2001 | Stech | | |
| 6,722,686 B2 * | 4/2004 | Koy | .............................. | 280/507 |
| 6,883,822 B1 * | 4/2005 | Smith | ......................... | 280/511 |
| 7,478,821 B2 * | 1/2009 | Konsela | .................... | 280/416.1 |
| 7,661,694 B2 | 2/2010 | Krespach et al. | | |

FOREIGN PATENT DOCUMENTS

| | | |
|---|---|---|
| DE | 1 845 701 U | 1/1962 |
| DE | 200 03 480 U1 | 5/2000 |
| DE | 10 2005 026 273 B3 | 1/2007 |
| EP | 1 559 592 A1 | 8/2005 |
| GB | 2167365 * | 5/1986 |
| WO | WO 2007/093069 | 8/2007 |

* cited by examiner

*Primary Examiner* — Anne Marie M Boehler
(74) *Attorney, Agent, or Firm* — Henry M. Feiereisen LLC

(57) ABSTRACT

The invention relates to a trailer coupling (1) for fastening to a towing vehicle, having a flange plate (2) and a hitch ball (3), wherein a neck (4) that connects the flange plate (2) and the hitch ball (3) is formed. For a high force load capacity, small installation space requirements, weight efficient constructability and assurance of large swivel angles, it is suggested, that the maximal extent of the neck (4) in a first direction (91) is smaller than in a second direction (92), which is normal to the first direction (91).

15 Claims, 3 Drawing Sheets

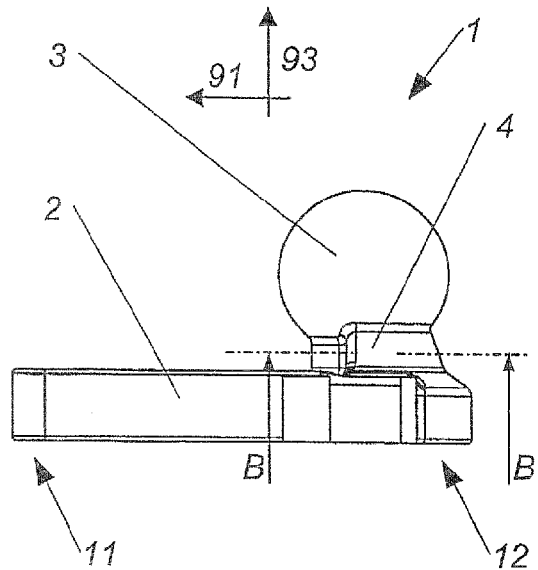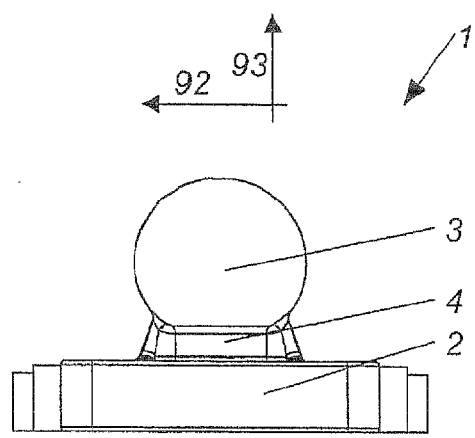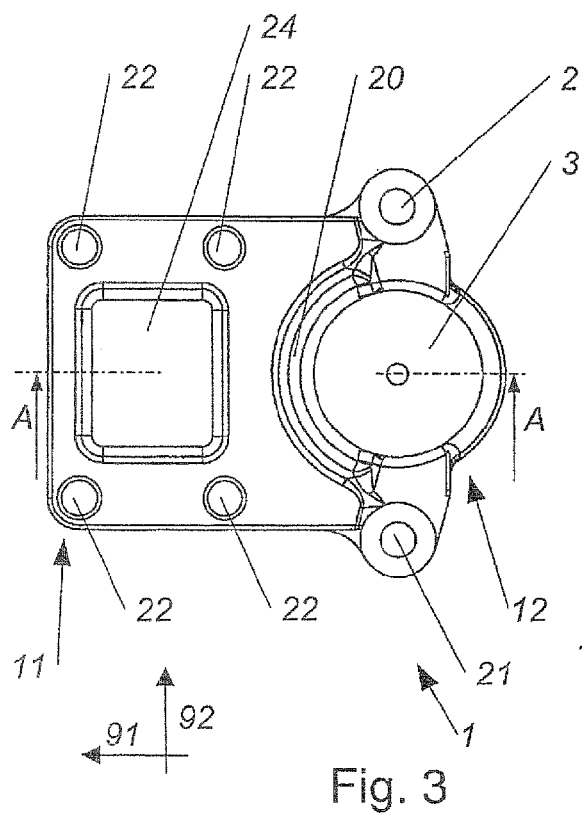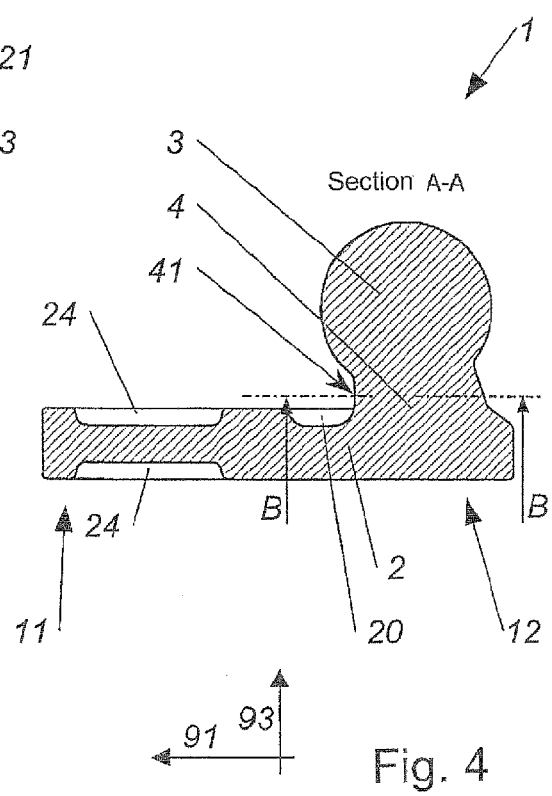
Fig. 1
Fig. 2
Fig. 3
Fig. 4

US 8,596,665 B2

TRAILER COUPLING

CROSS-REFERENCES TO RELATED APPLICATIONS

This application is the U.S. National Stage of International Application No. PCT/AT2010/000180, filed May 21, 2010, which designated the United States and has been published as International Publication No. WO 2010/144927 and which claims the priority of Austrian Patent Application, Serial No. A 924/2009, filed Jun. 16, 2009, pursuant to 35 U.S.C. 119(a)-(d).

BACKGROUND OF THE INVENTION

The invention relates to a trailer coupling. The trailer coupling—together with a trailer-side coupling element—is provided for forming a towing device that can be coupled. The trailer coupling represents the towing-device-side part, and the trailer-side coupling element represents the trailer-side part of the towing device.

Known trailer couplings embrace the hitch ball. The trailer coupling is mounted on the towing vehicle, for example by bolting. The hitch ball is fixed in position relative to the towing vehicle. For coupling of the trailer to the towing vehicle, a ball hitch tow bar of a trailer-side coupling element, for example of a pull rod, is placed on the hitch ball. Oftentimes, the coupled ball hitch tow bar, which essentially can include the shape of a spherical shell, is held down in a coupled position by a downholder which prevents a dislodging of the ball hitch tow bar from the hitch ball.

Known towing vehicles are configured for the coupling of different trailers and other tools or transport devices. Because space is limited at the trailer-side end of the towing vehicle, the space-efficient configuration of the trailer coupling is desirable.

Tools become increasingly larger and towing vehicles become increasingly more powerful, so that—for an efficient cultivation, for example of fields,—known trailer couplings are subjected to ever higher forces. Oftentimes, known trailer couplings have to be reinforced, i.e. they have to be built larger and with more material which disadvantageously leads to an increase of the own weight and the required space of the known trailer coupling. A further disadvantage when using this reinforcement of the trailer coupling can be that the maximal possible swivel angle between the trailer coupling and the trailer-side coupling element is decreased and, if applicable, a legally mandated minimal swivel angle, for example 20°, is hardly achieved.

SUMMARY OF THE INVENTION

An object of the invention is therefore to provide a trailer coupling of the afore-mentioned type, which withstands high force loads, requires little space, is weight efficient and can ensure large swivel angles.

According to the invention this is achieved by a trailer coupling for fastening on a towing vehicle with a flange plate, and a hitch ball, wherein a neck is formed which connects the flange plate and the hitch ball, wherein the maximal extent of the neck is smaller in a first direction than in a second direction which is normal to the first direction. This results in the advantage that the neck can transmit large forces, while still allowing a weight efficient design of the trailer. This results in the advantage that a large swivel angle can be ensured. This results in the advantage that the trailer coupling can be built in a compact, i.e. space saving manner.

BRIEF DESCRIPTION OF THE DRAWING

The invention is further explained with reference to the attached drawings in which merely preferred embodiments are illustrated by way of example.

It is shown in

FIG. 1 a side view of the trailer coupling of a particularly preferred first embodiment in viewing direction in the second direction;

FIG. 2 a front view of the trailer coupling of FIG. 1 in viewing direction in the first direction;

FIG. 3 a plan view of the trailer coupling of FIG. 1 in viewing direction in opposition to the third direction;

FIG. 4 the trailer coupling of FIG. 1 taken along the section line A-A, as drawn in FIG. 3;

DETAILED DESCRIPTION OF PREFERRED EMBODIMENTS

Figures 5, 6:
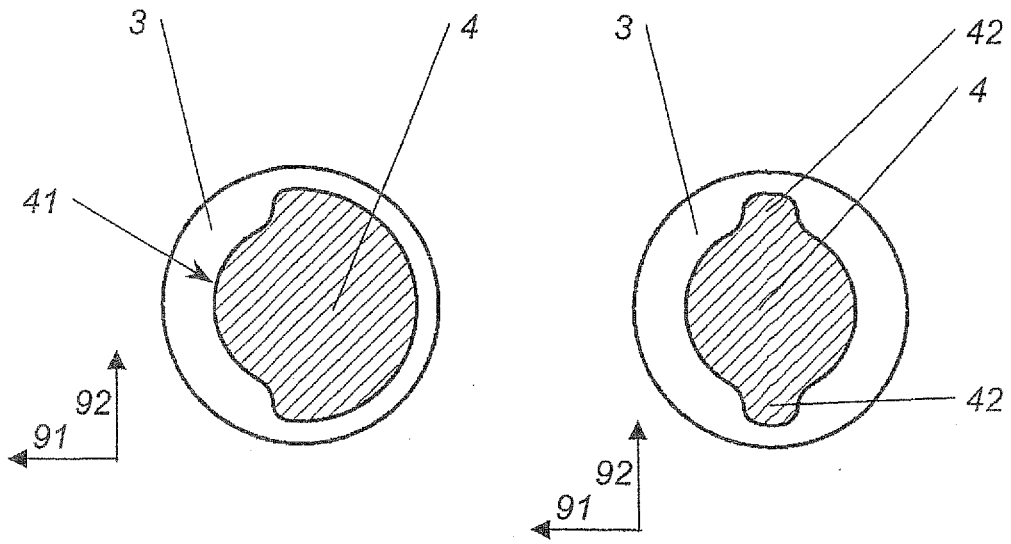
FIG. 5 the hitch ball and the neck taken along the section line B-B, as drawn in FIGS. 1 and 4.
FIG. 6 a view taken along the section line B-B of FIG. 5 of the hitch ball and the neck of a trailer coupling according to an advantageous second embodiment.

The FIGS. 1 to 11 show two advantageous embodiments of a trailer coupling 1 for securement to a towing vehicle with a flange plate 2 and a hitch ball 3, wherein a neck 4 is formed which connects the flange plate 2 and the hitch ball 3.

For high force load capacity, for small required installation space and for weight-efficient constructability of the trailer coupling 1 as well as for ensuring large swivel angles between the trailer coupling 1 and a trailer-side coupling element 8, it is proposed that the maximal extension of the neck 4 is smaller in a first direction 91 than in a second direction 92 which is normal to the first direction 91. Likewise, the maximal extension of the neck 4 is greater in the second direction 92 than in the first direction 91 which is normal to the second direction 92.

FIGS. 1 to 5 and 7 to 11 show a particularly preferred first embodiment of the trailer coupling 1. FIG. 6 shows parts of an advantageous second embodiment of the trailer coupling 1. The hitch ball 3 of the embodiments of the trailer coupling 1 shown in the Fig. has the same diameter.

Figure 7:
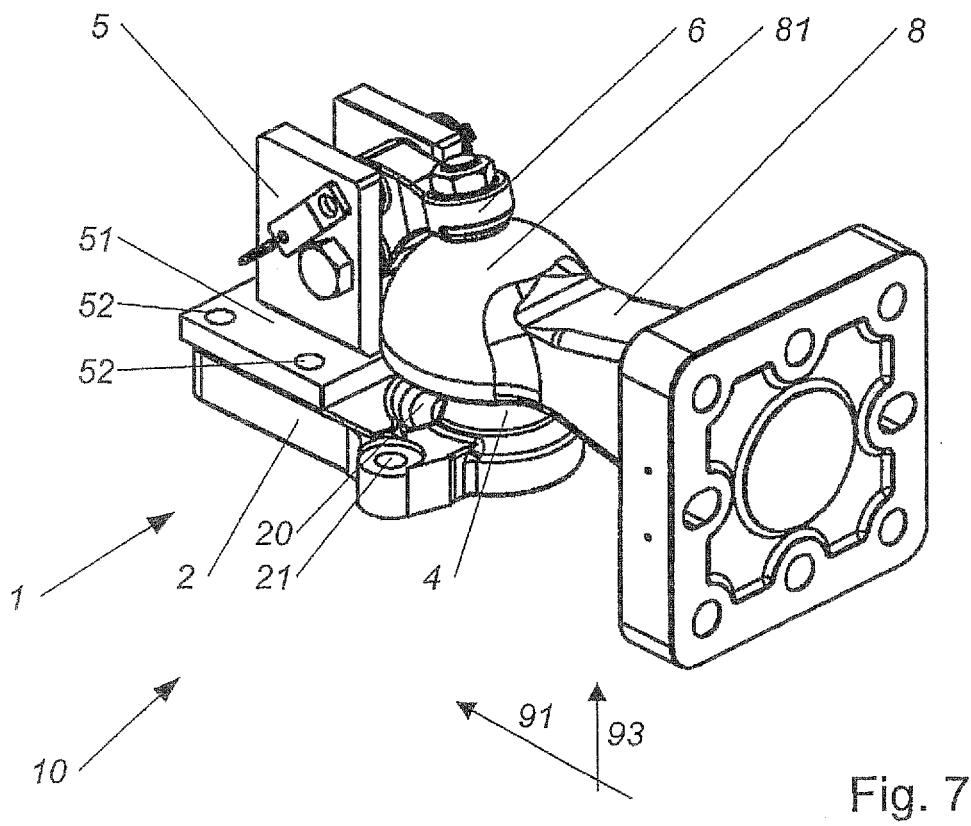
FIG. 7 an axonometric view of the engaged trailer coupling of FIG. 1, a mounting module of a downholder, and a trailer-side coupling element.

FIG. 7 further shows the trailer coupling 1 with the coupled trailer-side coupling element 8, which includes a ball hitch tow bar 81. The ball hitch tow bar 81 has a region in the shape of a ball socket for placement onto the hitch ball 3. The ball-socket-shaped region can be referred to as spherical shell. The trailer-side coupling element 8 can, in particular, be configured as towing element, preferably as towing rod. The trailer coupling 1 together with the engaged trailer-side coupling element 8 form a towing device 10. The trailer coupling 1 and the engaged trailer-side coupling element 8 are illustrated in FIG. 7 in a straight alignment in which the longitudinal direction of the trailer-side coupling element 8 is oriented essentially parallel to the first direction 91. In the straight alignment, the swivel angle between the trailer coupling 1 and the trailer-side coupling element 8 is zero degree i.e. 0°. In the straight alignment, a steering angle between the trailer coupling 1 and the trailer-side coupling element 8 is also 0°.

The swivel angle is measured at a steering angle of 0° and is the angle by which the trailer-side towing element is swingable about the hitch ball 3 in a first plane defined by the first direction 91 and a third direction 93. The steering angle is measured at a swivel angle of 0° and is the angle by which the trailer-side towing element 8 is rotatable around the hitch ball 3 in a plane defined by the first direction 91 and the second direction 92. In operating position of the trailer coupling 1, i.e. in particular in a position when mounted to a towing vehicle, the first plane can be arranged vertically and the second plane can be arranged horizontally.

The trailer coupling 1 is provided for mounting on the towing vehicle. When the trailer coupling 1 is mounted, the towing vehicle is configured with the trailer coupling 1. The towing vehicle can also be referred to as tractor and can in particular be configured as tractor that is customary in trade. The trailer coupling 1 is further provided for coupling of a trailer to the towing vehicle. When the trailer is coupled, the towing vehicle together with the trailer can form a towing vehicle-trailer combination, in particular an agricultural towing vehicle-trailer combination. Since the neck 4 is formed for transferring particularly large forces parallel to the first direction 91, the trailer coupling 1 is advantageously suited for towing a plough, a harrow or a cultivator. During cultivation, especially large forces act parallel to the first direction 91.

In operating position of the trailer coupling 1 the first direction 91 can coincide with the longitudinal direction of the towing vehicle especially the towing vehicle-trailer vehicle combination. In straight operation of the towing vehicle-trailer combination, i.e. of the towing vehicle with coupled trailer, the longitudinal directions of towing vehicle and trailer are approximately parallel to the first direction 91. In operating position of the trailer coupling 1 the second direction 92 can correspond to the cross direction of the towing vehicle, i.e. be oriented essentially parallel to the rear axle of the towing vehicle.

The length of the trailer coupling can be measured along the first direction 91. The first direction 91 can be referred to as longitudinal direction of the trailer coupling 1. The width of the trailer coupling 1 can be measured along the second direction 92. The second direction can be referred to as transverse direction of the trailer coupling 1. The trailer coupling 1 can have a plane of symmetry, around which the trailer coupling 1 is advantageously formed mirror symmetrically. FIG. 4 shows a section of the trailer coupling 1, with the section plane and the plane of symmetry of the trailer coupling 1 coinciding. In this context, the hitch ball 3 is arranged symmetrically in the plane of symmetry, with the longitudinal axis of the neck 4 being arranged in the plane of symmetry.

In particular, the longitudinal axis of the neck 4 can coincide with the third direction 93, in which third direction 93 the height of the trailer coupling 1 can be measured.

When the towing vehicle pulls the engaged working tool, in particular the trailer, forward in driving direction, in particular in straight direction, pulling forces oriented essentially parallel to the driving direction act on the hitch ball 3 which, in particular, can be pulling forces which are directed in parallel to the first direction 91 at a steering angle and a swivel angle of 0°, respectively. The first direction 91 can, in particular, be arranged in the same direction as the longitudinal axis of the towing vehicle.

The trailer coupling 1 has a first end 11 pointing in the first direction 91 of the trailer coupling 1 and a second end 12 of the trailer coupling 1 pointing in opposite direction to the first direction 91. In operating position of the trailer coupling 1, the second end 12 can point away from the towing vehicle. To ensure large swivel angles and large steering angles of the trailer coupling 1, the hitch ball 3 can in particular be positioned in the area of the second end 12 of the trailer coupling 1. In this sense, the first end 11 can be referred to as towing-device-side end of the trailer coupling 1 and the second end 12 can be referred to as trailer-side end of the trailer coupling 1.

The advantage of the configuration of the neck 4 according to the invention is that the neck 4 can be built particularly short, i.e. with a small neck length, while still ensuring a large swivel angle of for example significantly larger than 20°, of the trailer coupling 1, in particular of the towing device. In particular, a great steering angle of the trailer coupling 1, in particular of the towing device, can be ensured.

This has the advantage that great pulling forces can be transferred between the trailer coupling 1 and the ball hitch tow bar 81 of the trailer-side coupling element 8, with bending forces being small in the neck 4. This has the advantage that the trailer coupling 1 can be loaded with particularly great pulling forces.

Such a short neck 4 has the further advantage that the trailer coupling 1 can be formed in an especially space-saving manner, which allows a space-efficient mounting of the trailer coupling 1 to the trailer-side end of the towing vehicle.

It is particularly advantageous that the trailer coupling 1 can also be built in a weight-saving manner. Additional material, for example for broadening areas of the neck 4, can be saved in particular because of the short length of the neck 4, which makes it possible for the trailer coupling 1 to have even a lower weight than common trailer couplings.

In an advantageous refinement, the cross section of the neck 4 can correspond essentially to a circular cross section in which a piece is cut away. This geometry of the neck 4 is shown in FIGS. 1, 2, 4, 5, 8 and 10 and, in particular, can be recognized especially well in FIG. 5.

In this connection, the cut-away part of the circular cross section can be disposed at the border of the neck 4, which border points in the first direction 91 as already provided in the first embodiment of the trailer coupling 1. This has the advantage that the swivel angle can be especially large in upward direction for example over 30°, i.e. when the trailer-side towing element is swiveled upwards. At the border of the neck 4 which points into the first direction 91, the outer surface of the neck 4 is, at least in areas directed in the first direction 91.

As provided for example in the second embodiment of the trailer coupling 1, in an advantageous refinement of the invention, the cross section of the neck 4 can essentially correspond to a circular cross section, in which protuberances 42 are formed in the second direction 92. This advantageous geometry of the neck 4 is shown in FIG. 6. This has the advantage that the swivel angle can be particularly large in upward and downward direction, for example above 30°.

The neck length extends between the hitch ball 3 and the flange plate 2. The neck length extends from the transition of the conically shaped surface of the hitch ball 3 to the neck 4 up to the transition of the neck 4 to the flange plate 2. The transitions can be formed rounded. Here, the neck length extends approximately up to the middle of the rounded transitions. Particularly advantageously, the neck length can be less than the diameter, in particular less than the radius, of the hitch ball 3. Particularly advantageously, the neck length can be less than 0.6 times, in particular 0.4 times, preferably 0.3 times the diameter of the hitch ball 3. The shorter the neck length, the greater are the forces that can be transferred from the hitch ball 3 to the flange plate 2, while the cross sectional geometry of the neck 4 remains constant.

The neck 4 can advantageously protrude approximately normal from the flange plate 2. In particular, the neck 4 can be formed approximately straight. In particular, it can be provided that the neck 4 is only formed along a third direction 93, wherein the third direction 93 is directed normal to the first 91 as well as to the second direction 92. Advantageously, the flange plate 2 can lie in the second plane.

In particular—as shown in FIGS. 1, 2, 4 and 8 to 11—areas of the outer neck surface can be essentially parallel to the third direction 93 and tilted in the third direction 93. In particular, at least areas of the outer neck surface of the protuberances 42 can be tilted in the third direction 93. In particular, at least areas of the outer neck surface can be essentially parallel to the third direction 93 in the area of the cutaway piece of the circular cross section.

In an advantageous refinement, the cross section surface of the neck 4 can decrease essentially continuously in the direction of the hitch ball 3, in particular along the third direction 93. This has the advantage that the steering angle as well as the swivel angle can be sized substantially, in particular that, even in the case of a substantial steering angle, a large swivel angle is ensured.

In an advantageous refinement, the hitch ball 3 and the neck 4 can be formed as cast material, in particular as cast steel material, in one piece, for which purpose the hitch ball 3 and the neck 4 can be cast as one piece. This allows for the hitch ball 3 and the neck 4 to absorb and reliably transfer especially great forces.

Particularly preferably, the flange plate 2, the neck 4 and the hitch ball 3 can be formed in one piece. In particular, it can be provided in this connection that the flange plate 2, the neck 4 and the hitch ball 3 are cast in one piece as cast material, in particular as cast steel material, by which the trailer coupling 1 can be formed from a cast material, in particular a cast steel material. In this way the geometry of the neck 4 can be predetermined particularly accurately and the neck 4 can reliably transfer especially great forces.

In another advantageous refinement, the hitch ball 3 and the neck 4 can be formed in one piece as hitch ball unit and the hitch ball unit and the flange plate 2 can be formed in multiple pieces, in particular in two pieces, and the hitch ball unit can be firmly connected to, in particular bolted, to the flange plate 2. This has the advantage that different hitch ball units can be disposed at the same flange plate 2, wherein at least the diameter of the different hitch balls 3 of the different hitch ball units can differ from each other.

In this connection, the flange plate 2 can have a first positional fastener and the neck 4 can have a second positional fastener, and the first fastener and the second fastener can engage with one another when the neck 4 is fastened at the flange plate 2. In this way, it can easily be ensured that neck 4 and hitch ball 3 can be arranged in a predetermined position, even when the trailer coupling 1 is formed in two or more pieces, which is advantageous, since the neck cross section—as described before—is formed such that it deviates from the circular shape. In particular the first positional fastener and the second positional fastener can be configured such that only one mounting position of the neck 4 is possible on the flange plate 2. In particular, the first positional fastener can be formed as a groove. In particular, the second positional fastener can be formed as protrusion, especially as protrusion-shaped tongue. In this way, the protrusion on the neck 4 can engage in the groove of the flange plate 2, which allows to arrange the neck 4 in a torsion-proof manner in a predetermined position.

The neck cross section, as the cross section of the neck 4, can be formed in particular parallel to the flange plate 2.

The neck cross section as the cross section of the neck 4, can be, in particular, essentially normal to the longitudinal axis of the neck 4. The longitudinal axis of the neck extends through the center of the hitch ball 3 and can, in particular, be normal to the flange plate 2.

In an advantageous refinement of the trailer coupling 1, the flange plate 2 can have a depression 20 adjacent to the neck 4, wherein the depression 20 increases the tiltability of a ball hitch tow bar 81 of the trailer-side coupling element 8 which is placed onto the hitch ball 3. This depression 20 is formed in the illustrated first embodiment of the trailer coupling 1. The neck length is enlarged in areas by the depression, wherein the neck length can vary along the circumference of the neck 4. Here, the neck 4 can have a mean neck length, which is established by the average of the neck length along the circumference of the neck 4. Particularly advantageously, the mean neck length can be smaller than 0.6 times, in particular 0.4 times, preferably 0.3 times the diameter of the hitch ball 3. The depression 20 enables a particularly great upward swivel angle, which can significantly exceed for example 30°, in particular 40°.

In an advantageous refinement, the flange plate 2 can have first fastening openings 21 in the second direction 92 beside the neck 4 for interaction with first fasteners which do not protrude over the flange plate 2 in direction of the hitch ball 3. The first fastening openings 21 can in particular be formed in the first and/or second embodiment of the trailer coupling 1. This has the advantage that the flange plate 2 can be fixed immediately next to the neck 4 by means of the first fasteners. This has the advantage, that the forces acting on the hitch ball 3 can be conducted via a short distance into the first fasteners. The first fasteners can in particular be formed as bolts, as threaded bolts, as screws and/or clamps, and extend into the fastening openings, in particular from below.

Advantageously, the flange plate 2 can be provided for mounting on a carrier of the towing vehicle. This has the advantage of a simple, quick and force-locking mountability of the trailer coupling 1 on the towing vehicle. In particular, a draw bar of the towing vehicle can form the carrier. The draw bar can be arranged between both lower links of the towing vehicles. The draw bar can be pivotally mounted on the towing vehicle in the first plane, in particular the horizontal plane. The draw bar can have openings for securement of fasteners, in particular screws and/or bolts.

The carrier can be detachably fastened to the towing vehicle. In this way, the trailer coupling 1 can be detached from the towing vehicle together with the carrier. In particular, this can be provided if the carrier is formed as draw bar of the towing vehicle.

In an advantageous refinement, the flange plate 2 can have second fastening openings 22 for fastening the flange plate 2 on the carrier with second fasteners. In particular, the flange plate 2 can have first and second fastening openings 21, 22 wherein the distance between the second fastening openings 22 and the hitch ball 3 is larger than between the first fasteners 21 and the hitch ball 3. This has the advantage that the flange plate 2 can be fastened on any end of these carriers which are embraced by the towing vehicle.

Figure 10:
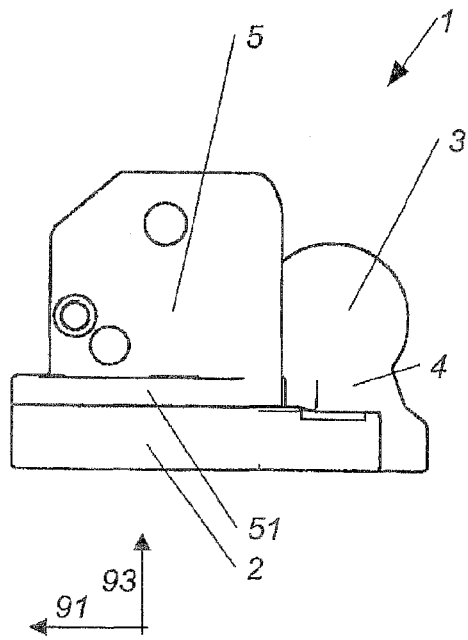
FIG. 10 a side view of the trailer coupling of FIG. 1 and the mounting module of the downholder in viewing direction in the second direction.
Figure 11:
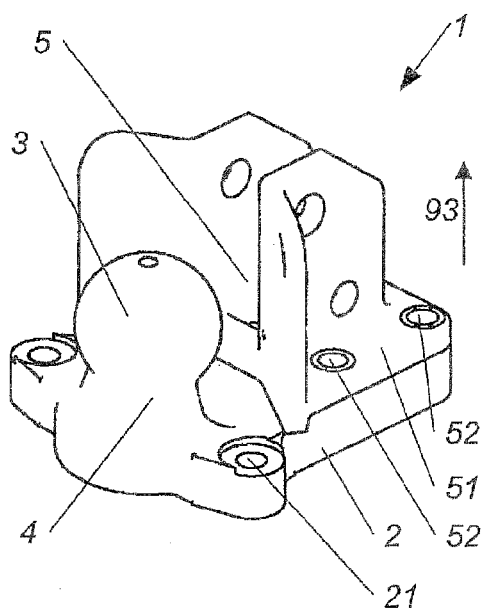
FIG. 11 an axonometric illustration of the elements of FIG. 10.

In an advantageous refinement, a receptacle 51 of a mounting module 5 of a downholder 6 can be disposed in the area of the second fixing opening 22, which receptacle 51 has openings 52 which correspond with the second fastening openings 22 of the mounting module 5, wherein the mounting module 5 can be fastened on the carrier together with the flange plate 2. In this way the installation of trailer coupling 1 and mounting module 5 can be carried out particularly easily and fast. This installation can be accomplished by placing the trailer coupling 1 on the carrier, then placing the mounting module 5 on the trailer coupling 1, and then firmly connecting, in particular bolting, the carrier, the trailer coupling 1 and the mounting module 5 to one another. This has the advantage of an easy, reliable, fast and force-locking mountability of trailer coupling 1 and mounting module 5 on the carrier. The mounting module 5 is illustrated in FIGS. 7, 10 and 11.

Figure 8:
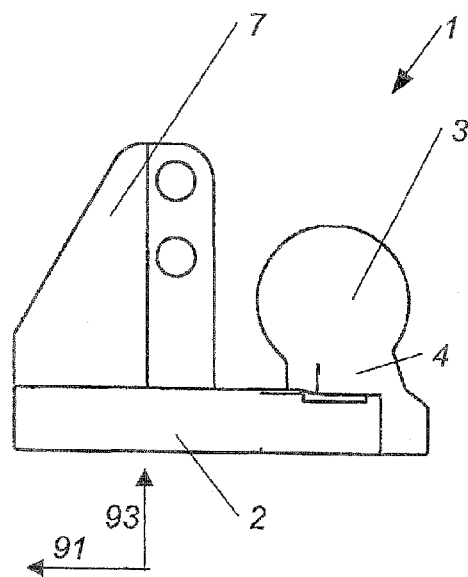
FIG. 8 a side view of the trailer coupling of FIG. 1 and a mounting of the downholder in viewing direction in the second direction.
Figure 9:
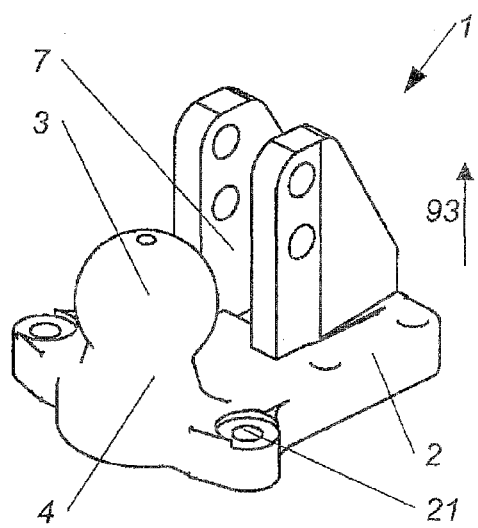
FIG. 9 an axonometric illustration of the elements of FIG. 8.

In another advantageous refinement, instead of the mounting module 5, a mounting 7 of the downholder 6 can be provided. Instead of the trailer coupling 1, the mounting 7 of the downholder can be fixed directly to the towing vehicle. In another embodiment, the mounting 7 can be firmly, in particular non-detachably, connected to the flange plate 2. For example, the mounting can be welded to the flange plate 2, which welding is a fixed, non-detachable connection. The firm connection between mounting 7 and flange plate 2 is shown in FIGS. 8 and 9.

For further weight saving, the flange plate 2 can have at least a second recess 24. In particular, the flange plate 2 can have two second recesses 24, as shown in FIG. 4. In particular, the second recess 24 can be disposed between the second fastening openings 22.

Further embodiments according to the invention comprise merely a part of the described features, wherein each combination of features, in particular also of different described embodiments can be provided.

The invention claimed is:

1. A trailer coupling for fastening to a towing vehicle, said trailer coupling comprising:
    a flange plate having fastening openings for fastening the flange plate on a carrier with fasteners;
    a hitch ball;
    a neck forming a connection between the flange plate and the hitch ball and having a maximal extent in a first direction and a maximal extent in a second direction, said first direction being normal to the second direction, wherein the maximal extent in the first direction is smaller than the maximal extent in the second direction; and
    a downholder having a mounting module constructed for securement on the carrier together with the flange plate, said mounting module having a receptacle disposed in a region of the second fastening openings and having openings in correspondence with the second fastening openings.

2. The trailer coupling of claim 1, wherein the neck has a cross section of essentially circular configuration save for a piece being removed.

3. The trailer coupling according to claim 2, wherein the piece being removed is arranged at a border of the neck pointing in the first direction.

4. The trailer coupling of claim 1, wherein the neck has a cross section of essentially circular configuration and is provided with protuberances extending in the second direction.

5. The trailer coupling of claim 1, wherein the hitch ball is defined by a diameter, said neck having a length extending between the hitch ball and the flange plate, said length being sized smaller than 0.6 times the diameter of the hitch ball.

6. The trailer coupling of claim 1, wherein the hitch ball is defined by a diameter, said neck having a length extending between the hitch ball and the flange plate, said length being sized smaller than 0.4 times the diameter of the hitch ball.

7. The trailer coupling of claim 1, wherein the hitch ball is defined by a diameter, said neck having a length extending between the hitch ball and the flange plate, said length being sized smaller than 0.3 times the diameter of the hitch ball.

8. The trailer coupling of claim 1, wherein the flange plate, the neck and the hitch ball are formed in one piece.

9. The trailer coupling of claim 1, wherein the flange plate has a depression adjacent to the neck for increasing a tiltability of a ball hitch tow bar placed on the hitch ball and forming part of a trailer-side coupling element.

10. The trailer coupling of claim 1, wherein the flange plate has additional fastening openings in the second direction adjacent to the neck for interaction with additional fasteners sized to not project beyond the flange plate in a direction of the hitch ball.

11. The trailer coupling of claim 1, wherein the hitch ball and the neck are formed as cast material.

12. The trailer coupling of claim 1, wherein the hitch ball and the neck are formed as cast steel material.

13. The trailer coupling of claim 1, wherein the downholder has a mounting firmly connected to the flange plate.

14. The trailer coupling of claim 13, wherein the mounting is non-detachably connected to the flange plate.

15. A towing vehicle, comprising a trailer coupling as set forth in claim 1.

\* \* \* \* \*